Patented Aug. 20, 1929.

1,725,561

UNITED STATES PATENT OFFICE.

JAMES ELIOT BOOGE, OF HILLSIDE, NEW JERSEY, AND COLE COOLIDGE, OF WILMINGTON, DELAWARE, ASSIGNORS TO E. I. DU PONT DE NEMOURS & COMPANY, OF WILMINGTON, DELAWARE, A CORPORATION OF DELAWARE.

MODIFICATION OF DRYING OILS.

No Drawing.      Application filed March 7, 1928. Serial No. 259,907.

This invention relates to methods of treating drying oils to modify their properties and thereby make them more suitable for use in coating compositions. More particularly it relates to methods of modifying linseed oil to adapt it for use in white paints and enamels.

Many methods have been suggested for modifying the properties of drying oils to make them suitable for use in paint and varnish compositions. These methods include a number of different ways of heat-treating and blowing under various conditions and at varying temperatures. However, the treated oils produced by these processes have invariably failed to meet certain requirements recognized as desirable in the art of coating compositions. In particular, these treated oils lack the combination of properties recognized as desirable in formulating a satisfactory gloss white paint. To be suitable for this purpose the oil must be quick drying and at the same time be capable of giving a film which is free from yellowing when aged in the dark. When paint oils have been produced having a satisfactory flow and drying rate, it has invariably been the case that the oil is either too highly colored to be satisfactory in a white paint or that the paint film becomes yellow on aging, and particularly is this true when the film or coating is aged in the dark or without frequent exposure to sunlight.

One object of this invention is to provide an improved process for treating drying oils. Another object is to produce a light colored paint oil having a satisfactory flow and drying rate, and capable of producing a film which is substantially non-yellowing when aged in the dark. Still another object is to produce a treated linseed oil suitable for use in white gloss paint having a normal flow and capable of drying overnight to a dust-free film which does not yellow when aged in the dark. Other objects will be apparent from the description.

These objects are accomplished by heat-treating a drying oil to a definite viscosity, the treatment being conducted at a moderate temperature in the absence of air or other oxidizing gases and with continual removal of volatile products of decomposition from contact with the oil, the heat treatment being followed by cooling the oil out of contact with air and subsequently subjecting the oil to an air blowing treatment until the drying properties of the oil are satisfactory, the blowing treatment being carried out at a temperature substantially lower than that used for the heat treatment.

The following is given as a specific example of the process, the invention, however, not being limited to the specific details thereof:—

The equipment consists essentially of two closed cylindrical aluminum kettles, the first of which is a heat-treating kettle, having a capacity of 100 gallons, and the second a blowing kettle with a capacity of 130 gallons. The heat-treating kettle is externally electrically heated and provided with thermostatic temperature control. It is also provided with a gas inlet top and bottom, and a gas outlet at the top, also with liquid inlet and outlet. The blowing kettle is heated by a steam coil and at the bottom there is a perforated aluminum coil connected with an air supply at about 80 lbs. air line pressure.

Using a mixture of linseed oil and soya bean oil in the proportion of 85% linseed and 15% soya, the heat-treating kettle is charged with about 83 gallons of the mixed oil as measured cold. This quantity of oil will fill the kettle to capacity when heated to about 530° F. The oil is placed in the kettle and the heat turned on. During the heating-up period a stream of nitrogen is slowly bubbled through the oil, so that the oil is continuously agitated. In about four hours, the temperature of the oil reaches 400° F., and the current of nitrogen is switched from the bottom gas inlet to the top inlet, and is passed over the surface of the oil at the rate of about 3 cu. feet per minute. The oil is maintained at a temperature of 525° F. to 530° F. for a period of about 40 hours. At the end of this time a test indicates a viscosity of about 23 poises at 25° C. indicating that the heat treatment has been completed. The heat is turned off, and the current of nitrogen over the surface of the oil is continued until the temperature falls to about 155° F. The oil is now transferred to the blowing kettle and while the heat is maintained between 150 and 160° F., the oil is blown with air for a period of about three hours. The blowing is then discontinued and, after cooling, the oil is ready for use.

The oil, as prepared by the above process, was tested in a mill gloss white formula containing approximately 40% lithopone, 17% zinc oxide, 28% oil, 15% turpentine and drier, the drier being used in such proportion that there was .07% lead and .013% cobalt based on the oil. The resulting paint was a pure white free flowing product, capable of drying dust-free when tested overnight at room temperature, and was substantially non-yellowing when aged in the dark.

The process described is capable of many modifications depending, in part, upon the raw material used, the design of the equipment and the particular properties desired in accordance with the use to which the oil is to be put.

The heat treatment and the blowing treatment may be conducted in separate kettles or containers as described, or the two treatments may be conducted in a single container provided with suitable means for heat control and with suitable gas inlets so that gases may be passed over the surface of the oil or may be bubbled through the oil. The mechanical means of accomplishing this may be any of the devices well known in the art. Any suitable material may be used for the construction of the necessary equipment so long as the material used does not discolor the oils. Aluminum equipment is highly satisfactory but in place of aluminum there may be used Monel metal or the like or there may be used enamel lined equipment. Where available, electric heat is usually preferable but other methods may be used with advantage, these methods including oil heating, heating with superheated steam and the like.

As raw material, it is preferable to use the raw drying oils, preferably those having a light color, for instance, linseed oil of the class commonly known as varnish oil. The process is also adapted to use with mixtures of the drying oils, e. g., linseed oil mixed with Perilla oil, soya bean oil, chinawood oil, and the like. If the oil used as raw material contains a small percentage of moisture, it has been found desirable during the period of heating up the oil to the proper temperature, to bubble the inert gas through the oil until the temperature rises to around 400° F. This procedure has the advantage that the gas carries off the moisture and avoids the separation of liquid water in the bottom of the kettle which may cause undesirable foaming when the temperature of the oil passes the boiling point of water.

During the heat treatment step it is preferable to avoid local overheating of the oil since it has been found that the overheating may result in excessive decomposition of the oil to form highly colored products which affect undesirably the color of the final product. For example, it is found that it is desirable to reduce to a minimum the proportion of heated metallic surface which extends above the liquid surface of the oil in the kettle, since the thin film of oil on this exposed surface is subject to decomposition with the formation of gummy deposits or crusts which discolor the final product. A convenient means of avoiding this difficulty is to maintain the kettle as full of oil as practicable during the heat treatment.

It has been mentioned as highly desirable that the volatile products of decomposition be carried away as fast as they are formed during the heat treatment. The importance of this is probably due to the fact that these decomposition products apparently catalyze the reverse reaction, and when present even in comparatively small amounts, it appears that they may act to slow down the changes normally brought about by the heat treatment. Several methods of carrying away these volatile decomposition products are feasible. For example, they may be removed by conducting the heat treatment under vacuum or by passing an inert gas over the surface of the oil, or by bubbling the gas through the oil. The most convenient method is to pass the inert gas over the surface of the oil and this is the method generally preferred. This method has the advantage that it makes it possible to fill the kettle almost completely with the oil without danger of foaming and this operates to improve the color of the product as already explained. A still more important advantage of the surface flow of gas is that in comparison with a blowing or bubbling treatment, the contact between the oil and the gaseous carrier is greatly reduced and thereby permits greater scope in the choice of an inert gas. For example, if the gaseous carrier is to be passed over the surface of the oil, it has been found quite satisfactory to use carbon dioxide as the carrier, although this gas is not entirely non-reactive toward the oil at temperatures above 500° F. However, carbon dioxide, when passed over the surface of the oil is found to be practically non-reactive and is quite satisfactory for the purpose intended. It is to be understood, therefore, that by the term non-reactive gaseous carrier it is meant to include those gases which may be passed over the surface of the oil at temperatures around 500° F. without reacting with the oil to a noticeable degree. As inert gases there may be used carbon dioxide, oxygen-free furnace gas, illuminating gas, nitrogen, or other oxygen-free gas or gas mixture coming within the definition.

In the usual practice of the process it is preferred to heat-treat the oil under the conditions described and at a temperature between 500° and 530° F. However, for many purposes it is found that desirable and advantageous results may be obtained by heat-treating the oil at temperatures between 490° and 550° F. At the lower temperature the after yellowing tendency of the final product is kept at a minimum but a somewhat longer time is required to attain a given viscosity, as compared with the treatment at somewhat higher temperatures. In the usual procedure, the heat treatment of the oil is completed when the oil has a viscosity between 18 and 27 poises determined at 25° C. but the invention is not confined to these limits since it has been found that valuable results may be obtained by bodying the oil until it has a viscosity of 10 poises or over.

As has been pointed out, it is preferable, after the heat treatment, to cool the oil out of contact with air or other oxidizing gases until the temperature has fallen below 200° F. This cooling may be carried out according to any one of a number of methods but under the conditions of operation, it is particularly convenient to continue the passage of the inert gas over the surface of the oil until the oil has cooled to the desired temperature.

In carrying out the air blowing treatment of the oil, it is generally preferred to operate at a temperature between 140° and 160° F. and to carry out the treatment for a period of from 2½ to 3½ hours. However, the invention is not limited to this range since useful results may be obtained by blowing the oil at temperatures between 135° and 200° F., and for periods ranging from 2 to 5 hours. The exact blowing conditions selected in any given treatment will vary with the grade of raw oil used and more particularly with the ultimate use to which the treated oil is to be put. It is found that the maximum improvement in the color of the oil and of the aged film is obtained by selecting the lower temperature range and that within the preferred temperature range it is possible to retain these advantages as to color and at the same time attain any desired drying rate which is normal to linseed oil, by continuing the blowing treatment under careful temperature control until the required drying rate is reached. Generally speaking, within the temperature ranges specified, the lower the temperature the longer the treatment required to reach a given drying rate and the higher the temperature the greater the tendency toward after yellowing difficulties. Blowing for an insufficient length of time results in an oil having a slow drying rate and over-blowing may result in a tendency of the oil toward the formation of skins in the paint cans or other containers.

In determining the end point of the blowing treatment, consideration is given to the intended use of the final product and in general the blowing treatment is carried out under the necessary conditions of treatment until the oil, when mixed into a paint with a normal proportion of drier, shows a satisfactory drying rate. For example, when treating an oil intended for use in a quick drying white enamel, the blowing is continued until the oil, when formulated in a white enamel containing as drier 0.07% lead and 0.013% cobalt based on the oil, will dry overnight to a dust-free film.

The drying oils prepared according to the process described are particularly useful in the formation of oil paints and varnishes and are of especial value in the formation of gloss white enamels. As prepared by the present processes, the oil is practically free from color and has a satisfactory flow and drying rate. Gloss white paints and enamels made from these oils and containing suitable driers are substantially non-yellowing when aged in the dark. It is possible to obscure or to counteract the inherent non-yellowing quality of these oils by the use of unsuitable driers; these difficulties are avoided and excellent results may be obtained by using with these oils lead, manganese, and cobalt driers, either separately or in combination, provided the amount of drier used does not exceed 0.15% lead, 0.06% manganese or 0.02% cobalt based on the oil.

No attempts have been made to formulate a satisfactory theory to explain the results obtained by the processes described, but the fact remains that, by practicing the procedures outlined, it is possible to obtain a drying oil giving a non-yellowing film if the oil is heat-treated to the viscosity prescribed, the oil, during the treatment, being kept out of contact with air and the treatment being carried out with the continuous removal of the volatile products of decomposition. At this stage in the process, the oil is useful for many purposes, having a satisfactory flow and giving a film which is non-yellowing in the dark. In accordance with the use to which it is to be put, the oil may have a viscosity of 10 poises and upwards to any desired body. However, the drying rate of this oil is too low for many uses and it has been found that the drying rate of the oil may be brought to any standard normal to the oil without sacrifice of color standards, if the oil is now subjected to an air blowing treatment at a temperature within the ranges specified, the blowing treatment being carried out until the oil has the desired drying rate.

Any suitable changes and variations may be made in carrying out the process without departing from the spirit and scope of the invention except as defined in the appended claims.

We claim:

1. The process of modifying drying oil which comprises heating the oil at a moderate temperature in the absence of oxidizing gas, and blowing the oil with an oxygen-containing gas at a temperature lower than that used for the heat treatment.

2. The process of modifying drying oil which comprises heating the oil at a moderate temperature in the absence of oxidizing gas, removing the products of decomposition during the heating, and subsequently blowing the oil with an oxygen-containing gas.

3. The process of producing light colored paint oil which comprises heating light colored drying oil in the absence of oxidizing gas at a temperature not above 550° F., and subsequently blowing the oil with an oxygen-containing gas at a temperature lower than that used for the heat treatment until the drying rate of the oil is such that when the oil is compounded in a gloss white paint with a normal proportion of drier the paint will give a film which dries dust-free on standing overnight.

4. The process of producing light colored paint oil which comprises heating light colored drying oil in the absence of oxidizing gas at a temperature not above 550° F. until the viscosity of the oil is at least 10 poises, cooling the oil to a temperature below 200° F., and blowing the oil with an oxygen-containing gas at a temperature below 200° F. for two to five hours.

5. The process of modifying drying oil which comprises heating the oil at a temperature between 490° and 550° F. in the absence of oxidizing gas, continuously removing the volatile products of decomposition formed during the heating, the heating being continued until the viscosity of the oil is at least 10 poises, cooling the oil below 200° F., and blowing the oil with an oxygen-containing gas at a temperature between 135° and 200° F. until the drying rate of the oil is satisfactory for paint purposes.

6. The process of producing a paint oil which is substantially non-yellowing when aged in the dark which comprises heating light colored drying oil at a temperature between 500° and 530° F. in the absence of oxidizing gas, continuously removing the volatile products of decomposition by passing a current of inert oxygen-free gas over the surface of the heated oil, continuing the heating until the viscosity of the oil is between 18 and 27 poises, cooling the oil in the absence of oxidizing gas to a temperature below 200° F., and blowing the oil with air at a temperature between 140° and 160° F. for a period of 2½ to 3½ hours.

7. The process of treating linseed oil which comprises heating the oil at 500°–530° F. in the absence of oxidizing gas, continuously removing the volatile products of decomposition formed during the heating, the heating being continued until the viscosity of the oil is between 18 and 27 poises, cooling the oil, and blowing the oil with air until the drying rate of the oil is satisfactory for paint purposes, the oil during the blowing being maintained at a temperature of 140°–160° F.

8. The process of claim 2 in which the drying oil comprises linseed oil.

9. The process of claim 3 in which the drying oil comprises linseed oil.

10. The process of claim 4 in which the drying oil comprises linseed oil.

11. The process of claim 5 in which the drying oil comprises linseed oil.

12. The process of claim 6 in which the drying oil comprises linseed oil.

13. The process of claim 4 in which the oil comprises a mixture of drying oils, one of which is linseed oil.

14. The process of claim 5 in which the oil comprises a mixture of drying oils, one of which is linseed oil.

In testimony whereof we affix our signatures.

JAMES ELIOT BOOGE.
COLE COOLIDGE.